United States Patent [19]

Waters

[11] Patent Number: 4,530,577
[45] Date of Patent: Jul. 23, 1985

[54] MOUNTING ASSEMBLY FOR SYNCHRONIZED ADJUSTMENT OF MULTIPLE MICROSCOPE HOUSING

[75] Inventor: George F. Waters, Sturbridge, Mass.

[73] Assignee: Codman & Shurtleff, Inc., Randolph, Mass.

[21] Appl. No.: 520,956

[22] Filed: Aug. 8, 1983

[51] Int. Cl.³ .............................................. G02B 21/18
[52] U.S. Cl. ..................................... 350/513; 350/521
[58] Field of Search ............... 350/511, 512, 513, 514, 350/515, 516, 517, 521

[56] References Cited

U.S. PATENT DOCUMENTS 3,994,557 11/1976 Hopkins .............................. 350/513
4,175,826 11/1979 Blaha et al. ......................... 350/516
4,341,435 7/1982 Lang et al. .......................... 350/515

Primary Examiner—John K. Corbin
Assistant Examiner—Lynn Vandenburgh Kent
Attorney, Agent, or Firm—Donal B. Tobin

[57] ABSTRACT

A mounting assembly for twin microscope housings to permit synchronized tilting of the microscopes including a central spindle whose outside surface is threaded to accommodate an annular collar whose inside surface has corresponding threads. A fixed bracket is mounted to the bottom of the spindle, and an adjustable bracket is mounted about the adjustable collar. A tilt bracket is pivotably mounted to the bottom bracket and slidably mounted to the adjustable bracket so that as the annular collar is rotated about the central spindle to raise and lower the adjustable bracket, the tilt bracket tilts with respect to the longitudinal axis of the spindle.

13 Claims, 5 Drawing Figures

MOUNTING ASSEMBLY FOR SYNCHRONIZED ADJUSTMENT OF MULTIPLE MICROSCOPE HOUSING

FIELD OF THE INVENTION

The present invention relates to a mounting assembly for multiple microscopes and more particularly to a mounting assembly which permits the synchronized tilting of a plurality of microscopes.

BACKGROUND OF THE INVENTION

In various kinds of microsurgery, it is often desirable to have two or more microscopes mounted together from a common support so that two or more surgical personnel can view the same operative site simultaneously. A variety of such mounting assemblies are available but the tilt angle which the optical path of the individual microscopes forms with a common vertical axis is usually set at the factory and is not adjustable. Each of the microscopes comes with its own objective lens. Each objective lens has a fixed focal length which is the working distance of the microscope from the operative field. If one wishes to change the working length, one must change the objective lens of each microscope and, thus, must adjust the tilt angle of each microscope so that the optical paths of the microscopes will cross at their new focal point. For a longer focal distance, the microscope tilt angle will decrease. For most multiple microscopes this adjustment must be made at the factory. Great care must be used when tilting the individual microscopes to make sure that each microscope is tilted at the same angle so that the optical paths of the microscope converge on the same spot so that the users of the multiple microscopes will all be looking at the same operating field.

It would be particularly advantageous to be able to synchronize the tilting of a number of microscopes without having to adjust the individual microscopes but by merely adjusting a single mounting. In this way, one of the surgical personnel, perhaps the chief surgeon, could adjust one's microscope to the desired operating field and the other microscopes disposed on the same housing would automatically be adjusted to the same field so that other surgical personnel, particularly interns and residents, could be assured of viewing the same operative site as the chief surgeon. A mounting assembly which would permit this synchronized tilting of a plurality of microscopes would add flexibility to the multiple microscope system without the disadvantage of using valuable operating room time to make sure that the microscopes were properly synchronized. The operating room personnel could quickly change objective lenses and working distances to adjust the microscope to work in a deep cavity.

In those instances where one of the microscopes is not being used by one of the operating room personnel but instead is connected to a recording or video monitoring system, the operating room surgeon can be assured that his recording system will be viewing the same operating field.

SUMMARY OF THE INVENTION

The present invention provides a mounting assembly for a multiple microscope housing to permit synchronized tilting of all of the microscopes together using a single adjustment and without the necessity of adjusting each microscope independently. This permits working length to be changed quickly without the time consuming and expensive delays of factory adjustment.

The mounting assembly includes a central spindle which can be attached to supporting structure. This central spindle can be a solid post or it can be an annular shaft through the center of which a light source can be directed. An adjusting collar connects with the spindle and threads cooperatively disposed on the confronting surfaces of the spindle and collar permit the collar to move axially up and down along the axis of the spindle as the collar is rotated with respect to the axis of the spindle. An adjustable bracket connects to the collar to permit the adjustable bracket to move axially along the spindle together with the collar. The mounting assembly also includes a plurality of tilt brackets to each of which can be connected a microscope housing. One end of each tilt bracket may be pivotably attached to the spindle and a second end of the tilt bracket can be slidably attached to the adjustable bracket so that when the adjustable bracket and the collar move together axially along the spindle, the second end of the tilt bracket will tilt with respect to the axis of the spindle. Thus, all of the tilt brackets will tilt in a synchronized fashion, and the angle of the light path of the microscope housings with respect to the common vertical axis of all of the microscopes will change the same amount. Thus, the working distance of all of the microscopes can be easily changed and all of the microscopes will be focused on the new operative field, and the tilt angle of all of the microscopes can be adjusted by merely rotating one collar. This collar rotation can be accomplished by a surgical assistant or the chief surgeon without having to individually adjust and check the tilt angles of the individual microscopes.

These and other features and advantages of the present invention will become apparent from the following detailed description of the preferred embodiments taken in conjunction with the following drawings.

DETAILED DESCRIPTION OF THE PREFERRED EMBODIMENT

Figure 1:
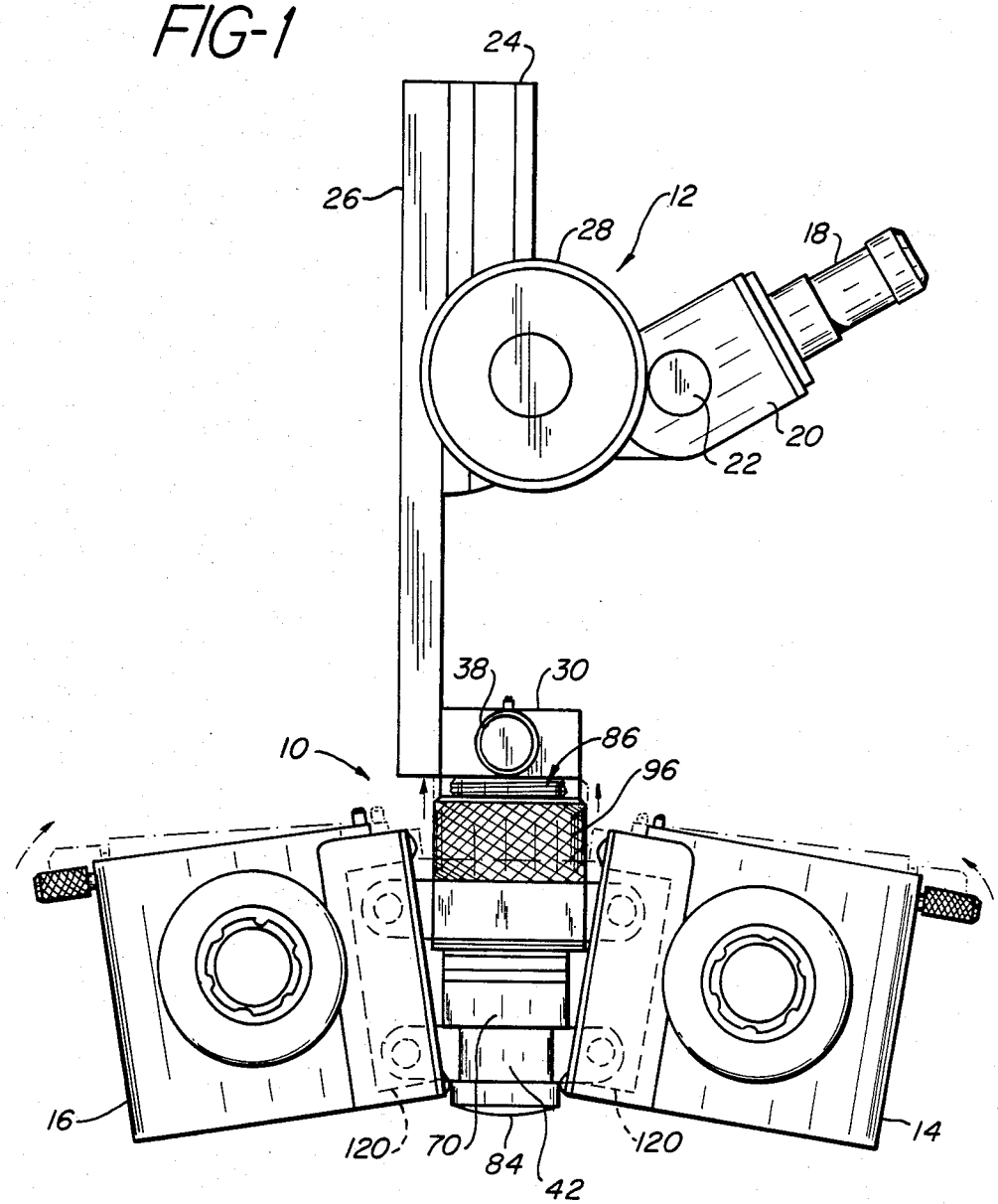
FIG. 1 shows a front elevation of the mounting assembly of the present invention together with the associated supporting structure and microscope housings.

Referring now to FIG. 1 there is shown a front elevation of the mounting assembly 10 of the present invention with the associated support structure 12 and microscope housings 14 and 16. Although only two microscope housings are shown in FIG. 1, any convenient number of microscope housings, for example 3 or 4 microscope housings, could be used. Support assembly 12 includes a shaft 18 which may be mounted to additional support structure (not shown) and a joint 20 for receiving shaft 18. Joint 20 pivots about pivot 22 and connects joint 20 to fine focus support 24. Mounting plate 26 connects to fine focus support 24 by means of a dovetail slot and groove configuration well known to those in this art and, therefore, not shown in detail in the drawings. Fine focus adjusting knob 28 operates through a well know worm drive to raise and lower mounting plate 26 with respect to fine focus support 24 for adjusting the fine focus of the microscope (not shown) which may be supported in each of microscope housings 14 and 16.

Figure 2:
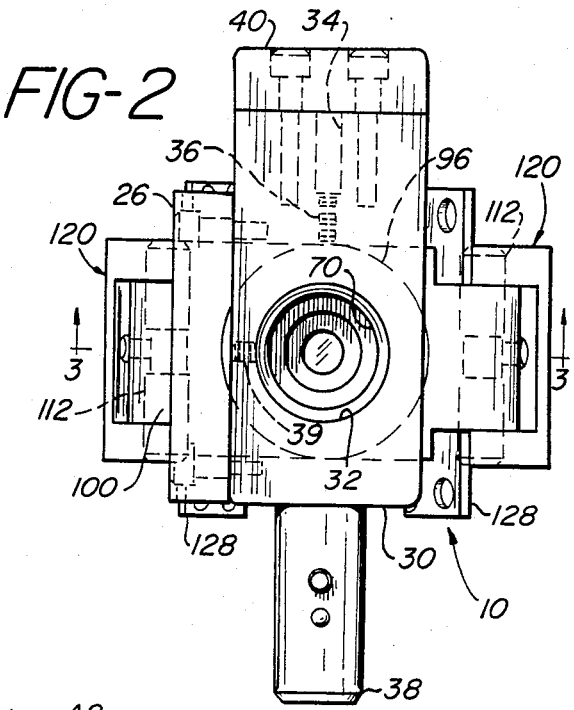
FIG. 2 shows a top view of the mounting assembly shown in FIG. 1 but omitting the microscope housings and associated support structure.
Figure 3:
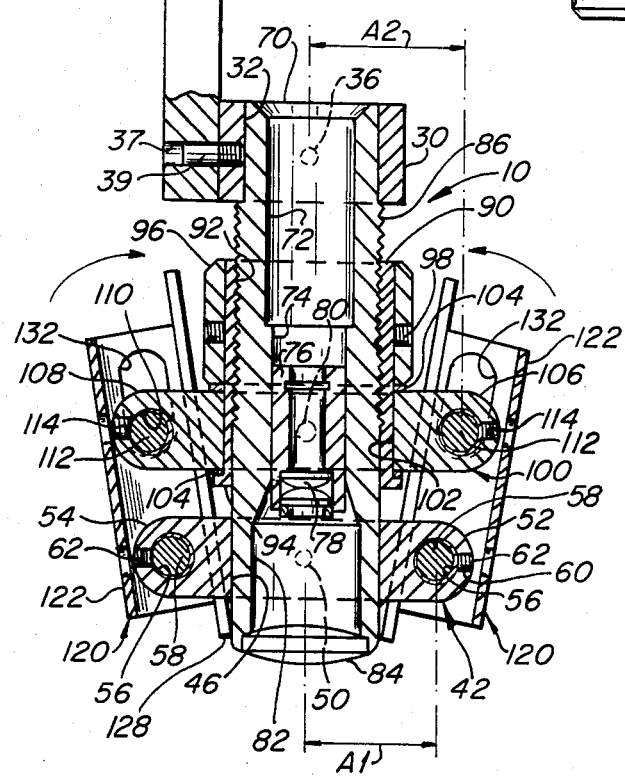
FIG. 3 shows a cross-sectional view of the mounting assembly shown in FIG. 2 taken along lines 3—3 in FIG. 2.
Figure 4:
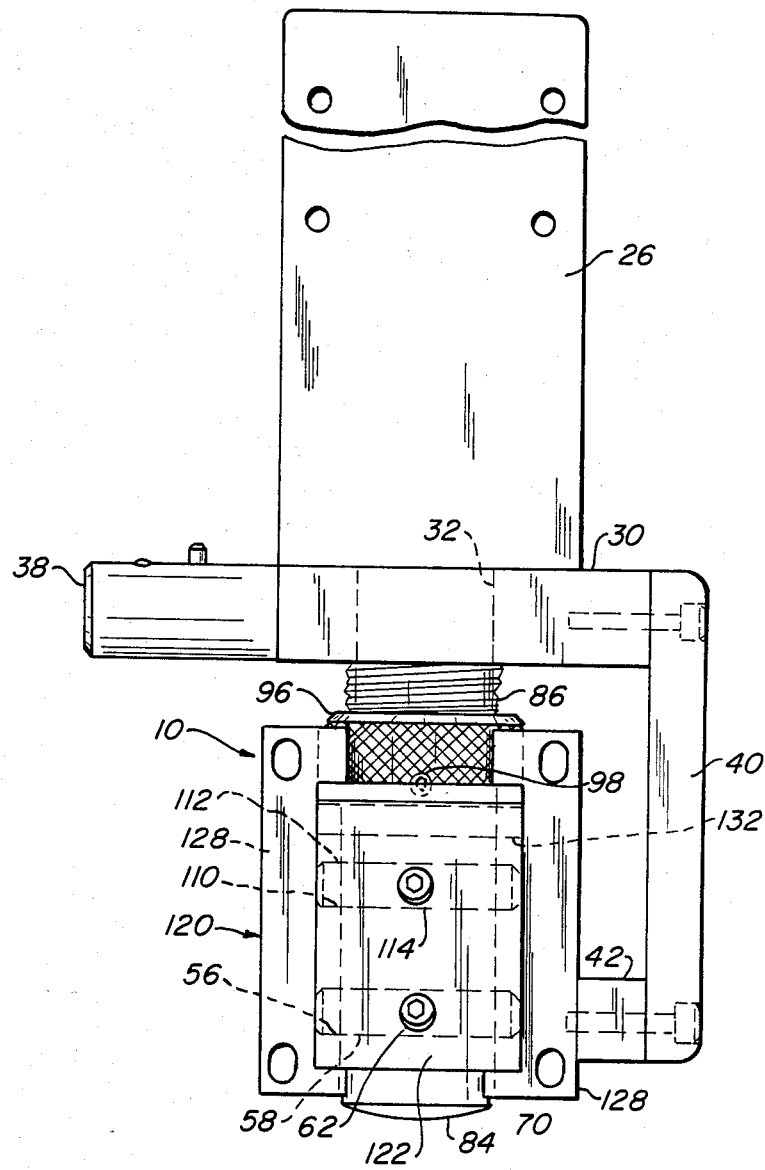
FIG. 4 shows a side view of the mounting assembly of FIG. 1 omitting the microscope housings; and, FIG. 5 shows a partial perspective of certain components of the mounting assembly.

Referring now to FIGS. 2, 3 and 4, the details of the mounting assembly 10 of the present invention will now be discussed. Top bracket 30 bolts to mounting plate 26 and includes a bore 32 extending vertically through top bracket 30. Bore 34, shown particularly in FIG. 2, extends horizontally through top bracket 30 and is threaded to accommodate a threaded set screw 36. A handle 38 for receiving an extension handle (not shown) extends transversely from top bracket 30. Bore 37 extends horizontally at right angles to bore 34 in top bracket 30 and accommodates set screw 39.

Side bracket 40 is bolted to top bracket 30 and extends vertically downward. Side bracket 40 can be formed as one piece with top bracket 30 if desired.

Fixed bracket 42 (which can also be described as a bottom bracket) is bolted to the bottom portion of side bracket 40.

Figure 5:
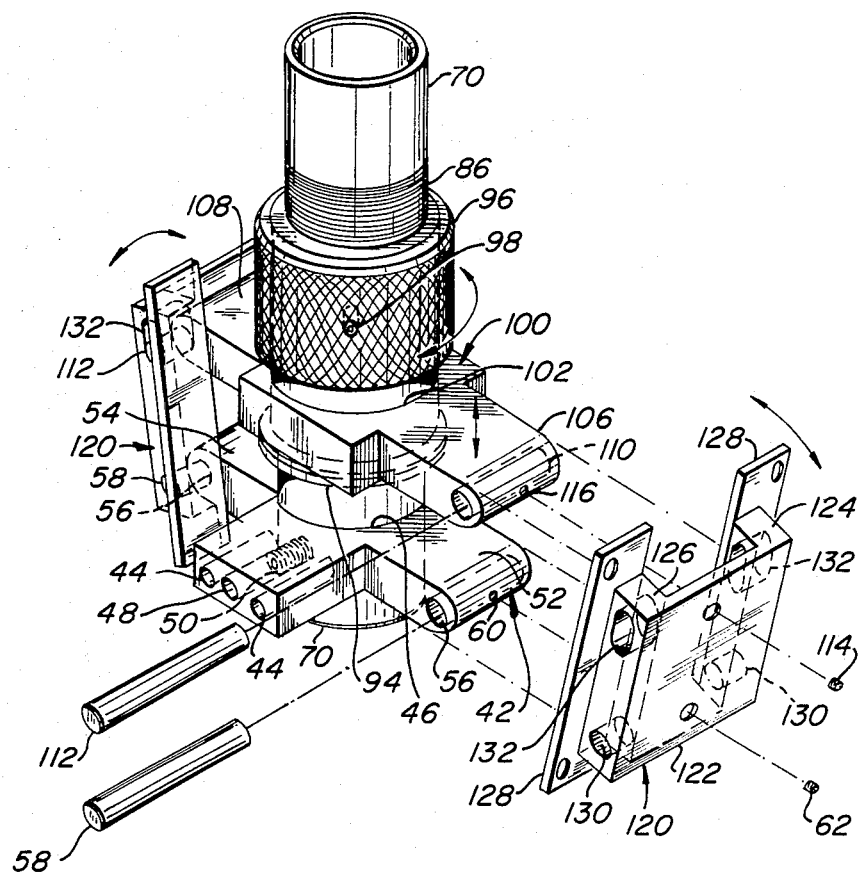

Fixed bracket 42 (as shown particularly in FIG. 5) includes tapped bores 44 for receiving bolts by which it is attached to side bracket 40. Fixed bracket 42 also has a bore 46 extending vertically through it, as shown in FIG. 3, aligned with bore 32 of top bracket 30. A tapped bore 48 extends transversely into bottom bracket 42 and meets bore 46 to accommodate a set screw 50. Fixed bracket 42 includes two outwardly extending support portions 52 and 54. Bores 56 extend transversely through support portions 52 and 54 at the same distance (A1) from the center of bore 46. Dowel pins 58 extend through each of bores 56 a short distance beyond the opposing sides of fixed bracket 42. Alternatively bore 56 need not go all the way through each of support portions 52 and 54 but may be drilled only part way therethrough. In that case two dowel pins 58 will be used in each of support portions 52 and 54.

Dowel pins 58 may be press fit into bores 56 or fixed bracket 42 may be equipped with additional set screw bores 60 to accommodate set screw 62 to hold dowel pins 58 in place.

An annular light tube 70 is mounted in bore 32 of top bracket 30 and in bore 46 of fixed bracket 42 by means of set screws 36, 39 and 50 mounted respectively in top bracket 30 and fixed bracket 42. The hollow interior of annular light tube 70 has an upper bore 72 for receiving a fiberoptic light cable fitting (not shown), a central bore 74 for receiving a light guide 76 which holds one or more lenses 78. Light guide 76 is held within bore 74 by means of set screw 80. The bottom portion of the interior of light tube 70 includes an exit bore 82 in the end of which is fixed an objective lens 84.

A major portion of the outer circumferential surface 86 of light tube 70 is threaded.

Alternatively, light tube 70 may be a solid post or central spindle which is not adapted to receive a light source.

It can be seen, particularly from FIG. 4, that top bracket 30, side bracket 40, bottom bracket 42 and light tube 70, when assembled, form a unitary structure to which the remaining components of mounting assembly 10 may be assembled.

Referring again, particularly to FIG. 3, there is shown a generally annular adjusting nut 90 whose inside surface 92 has threads which cooperate with the threaded surface 86 of light tube 70 so that as adjusting nut 90 is rotated about the axis of tube 70, adjusting nut 90 will translate up or down along light tube 70. Adjusting nut 90 includes a flange 94 extending radially outwardly.

A knurled annular sleeve or adjusting collar 96 is affixed about the outer circumferential surface of adjusting nut 90 by means of one or more set screws 98.

Adjustable bracket 100 has a central bore 102 extending vertically through it to receive adjusting nut 90. Adjustable bracket 100 rests on radial flange 94 of adjusting nut 90. Knurled sleeve 96 rests on top of adjustable bracket 100. Washers 104 may be placed between the confronting surfaces of knurled sleeve 96 and adjustable bracket 100 and radial flange 94 and adjustable bracket 100. Thus, it can be seen that adjustable bracket 100 will ride up and down along light tube 70 as knurled sleeve and adjusting nut 90 are rotated about the axis of light tube 70.

Like fixed bracket 42, adjustable bracket 100 has support portions 106 and 108 extending generally radially with respect to the axis of light tube 70. Similarly, transverse bores 110 extend through support portions 106 and 108 and are adapted to receive dowel pins 112 which, as with fixed bracket 42, may be either press fit into position or held in position by means of set screws 114 extending into said screw bores 116. The dowel pins 112 supported in adjustable bracket 100 extend a second distance A2 from the axis of light tube 70 greater than distance A1 which dowel pins 58 on fixed bracket 42 extend from the axis of light tube 70.

The remaining portion of mounting assembly 10 is a tilt guide 120 which includes a generally U-shaped base portion 122 having opposed, spaced apart sidewalls 124 and 126. Extending from the respective tops of opposed sidewalls 124 and 126 are attachment feet 128 through which tilt bracket 120 may be attached to a microscope housing 14 or 16.

A first end also called the bottom end in this embodiment of each of sidewalls 124 and 126 has a bore 130 for receiving dowel pins 58 which extend from fixed bracket 42.

The interaction of dowel pins 58 and bottom bores 130 of tilt brackets 120 permit tilt brackets 120 to pivot with respect to fixed bracket 42 and correspondingly with respect to the longitudinal axis of light tube 70.

The opposed sidewalls 124 and 126 also have at their second end, described as the upper end, a substantially vertically extending cam slot 132 for receiving dowel pins 112 of adjustable bracket 100. Tilt bracket 120 is shown as being constructed of three pieces, namely base 122 with its integral sidewalls 124 and 126 and two separate support feet 128. This piece could be made as one unitary structure if desired.

The operation of the mounting assembly 10 can be understood by referring to FIG. 3. It can be appreciated that the operator need only turn knurled sleeve 96 to correspondingly turn adjusting nut 90 to raise and lower adjustable bracket 100, thus, raising or lowering dowel pins 112 which are supported in adjustable bracket 100. The interaction of dowel pins 112 in cam slots 132 of tilt bracket 120 cause tilt bracket 120 and correspondingly microscope housings 14 and 16 to tilt inward so that the angle between the optical path of the microscope and the longitudinal axis of light tube 70 changes. It is also apparent that both microscopes will tilt together in synchronized fashion and that the angle between the respective light paths of the microscopes and the longitudinal axis of light tube 70 will remain equal to one another so that both microscopes will view the same operative site, thus permitting the microscopes to be quickly adjusted for new objective lenses and consequently new working distances.

This preferred embodiment has been described in conjunction with the use of only two microscopes for the mounting assembly. It will be apparent to those skilled in the art that the mounting assembly can be modified to accommodate additional microscopes for example three or four microscopes whose tilt angle can be adjusted in exactly the same fashion. In this embodiment bottom bracket 42 is fixed and upper bracket or adjustable bracket 100 rides axially up and down on light tube 70 as knurled sleeve 96 and adjusting nut 90 are rotated together. Those skilled in the art will realize that upper bracket 100 could be the fixed bracket and the bottom bracket 42 could be the adjustable bracket. Also for this alternative embodiment, the adjusting nut 90 could be inserted inside light tube 70 and knurled sleeve 96 and adjusting nut 90 could extend below the lower end of light tube 70.

The present invention has been described in conjunction with preferred embodiments. Those skilled in the art will appreciate that many modifications and changes may be made to the preferred embodiments without departing from the scope of the present invention. It is, therefore, not intended to limit the present invention except as set forth in the appended claims.

I claim:

1. A mounting assembly for multiple microscope housings to permit synchronized tilting of microscope attached to said housings comprising:
   a central spindle adapted for attachment to a supporting structure;
   an adjusting collar operatively engaging said spindle;
   means cooperatively disposed on said spindle and said collar to permit said collar to move axially of said spindle as said collar is rotated;
   an adjustable bracket operatively engaging said collar to permit said adjustable bracket to move axially of said spindle together with said collar;
   a plurality of tilt brackets each adapted for attachment to a microscope housing and each having a first end and a second end;
   means for pivotably connecting said first end of said tilt bracket to said spindle;
   means for slidably connecting said second end of said tilt bracket to said adjustable bracket so that as said adjustable bracket and said collar move together axially along said spindle, the second end of said tilt bracket will tilt with respect to the axis of said spindle to thereby tilt said plurality of tilt brackets in synchronized fashion.

2. The assembly of claim 1 wherein said cooperatively disposed means includes threads disposed in confronting relationship on said spindle and said collar.

3. The assembly of claim 1 wherein said means for pivotably connecting said first end of said tilt bracket to said spindle includes:
   a fixed bracket affixed to said spindle.

4. The assembly of claim 3 wherein:
   said first bracket includes a plurality of supporting portions each extending outwardly of the axis of said spindle a first distance; and
   said adjustable bracket includes a corresponding plurality of supporting portions each extending outwardly of the axis of said spindle a second distance greater than said first distance to provide a tilt for said tilt bracket.

5. A mounting assembly for multiple microscope housings to permit synchronized tilting of microscopes attached to said housings comprising:
   a central spindle adapted for attachment to a supporting structure;
   a fixed bracket affixed to said spindle and and including a plurality of supporting portions each extending outwardly of the axis of said spindle a first distance;
   an adjusting collar operatively engaging said spindle;
   means cooperatively disposed on said spindle and said collar to permit said collar to move axially of said spindle as said collar is rotated;
   an adjustable bracket operatively engaging said collar to permit said adjustable bracket to move axially of said spindle together with said collar, said adjustable bracket including a corresponding plurality of support portions each extending outwardly of the axis of said spindle a second distance greater than said first distance;
   a corresponding plurality of tilt brackets each adapted for attachment to a microscope housing and each having a first end for pivotable attachment to one of said fixed bracket support portions and having a second end adapted for slidable attachment to one of said adjustable bracket support portions so that as said adjustable bracket and said collar move together axially along said spindle, the second end of said tilt bracket will tilt with respect to the axis of said spindle to thereby tilt said plurality of tilt brackets in synchronized fashion.

6. The assembly of claim 5 wherein said spindle comprises an annular shaft having a first end adapted to receive a light source.

7. The assembly of claim 5 wherein said collar further includes a flange extending radially outwardly for engaging said adjustable bracket.

8. The assembly of claim 1 wherein each of said tilt brackets includes:
   first and second sidewalls each having a cam surface;
   a central portion connecting said sidewalls together so that said respective cam surfaces thereof are disposed in confronting, spaced-apart relationship;
   cam slots in each of said cam surfaces disposed adjacent said second end of said tilt brackets;
   cam means disposed on each of said adjustable brackets for operatively engaging said cam slots so that when said adjustable bracket and said collar move together axially along said collar, the camming action of said cam means in said cam slots tilts said plurality of tilt brackets in synchronized fashion.

9. The assembly of claim 1 wherein said supporting structure for said assembly includes:
   a spindle bracket adapted to be affixed to said spindle and to said fixed bracket and adapted for further attachment to additional supporting structure.

10. The assembly of claim 1 further including a microscope housing mounted to each of said plurality of tilt brackets.

11. The assembly of claim 8 wherein each of said tilt brackets further includes mounting feet adapted for attaching a microscope housing to each of said tilt brackets.

12. A mounting assembly for multiple microscope housings to permit synchronized tilting of microscopes attached to said housings comprising:
- a spindle aligned generally vertically and having a bore extending axially therethrough and adapted to receive a light source;
- a top bracket having a bore therethrough for receiving the top of said spindle;
- a bottom bracket affixed about the exterior of said spindle, said bottom bracket including a plurality of support portions each extending outwardly of the axis of said spindle a first distance;
- means for connecting said top bracket and said bottom bracket together, said top bracket, said bottom bracket and said connecting means forming a yoke for supporting said spindle;
- an adjusting collar disposed about the exterior of said spindle;
- cooperating threads on the confronting surfaces of said spindle and said collar to permit said collar to move up or down substantially axially along said spindle as said collar is rotated about the axis of said spindle;
- an adjustable bracket cooperatively engaging said collar to permit said adjustable bracket to move together with said collar along said spindle, said adjusting bracket including a corresponding plurality of supporting portions each extending outwardly of the axis of said spindle a second distance greater than said first distance;
- a corresponding plurality of tilt brackets each adapted for attachment to a microscope housing and each having a bottom end for pivotable attachment to one of said bottom bracket support portions and having a second end adaptable for slidable attachment to one of said adjustable bracket support portions so that as said adjustable bracket and said collar move together axially up and down along said spindle the second end of said tilt brackets will tilt with respect to the axis of said spindle to thereby tilt said plurality of tilt brackets in synchronized fashion.

13. The assembly of claim 12 wherein means for connecting said top and bottom bracket is unitary with said top bracket.

* * * * *